Figure 3:
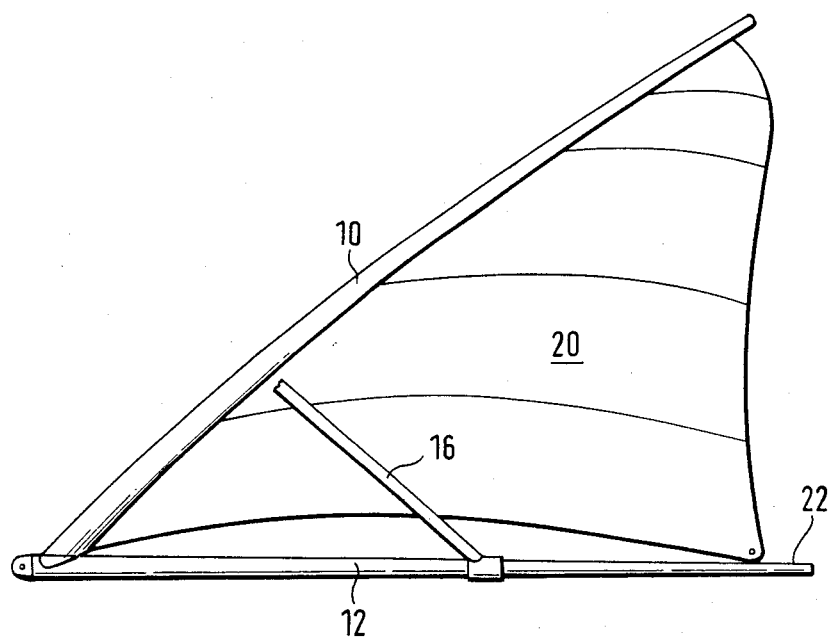

United States Patent [19]

Drake

[11] Patent Number: 4,651,665
[45] Date of Patent: Mar. 24, 1987

[54] HAND SAIL

[75] Inventor: James R. Drake, 385 Mesa Rd., Santa Monica, Calif. 90402

[73] Assignees: James R. Drake, Santa Monica, Calif.; Ulrich Stanciu, Fed. Rep. of Germany

[21] Appl. No.: 762,037

[22] Filed: Aug. 2, 1985

Related U.S. Application Data

[63] Continuation of Ser. No. 422,450, Sep. 24, 1982, abandoned.

[30] Foreign Application Priority Data

Oct. 13, 1981 [DE] Fed. Rep. of Germany ....... 3140685

[51] Int. Cl.⁴ .............................................. B63B 35/00
[52] U.S. Cl. ....................................... 114/39; 114/102
[58] Field of Search ................... 114/39, 90, 102, 103, 114/39.2, 39.1; 244/DIG. 1.1, DIG. 1.2

[56] References Cited

U.S. PATENT DOCUMENTS

| 2,537,560 | 1/1951 | Wanner ..................... 244/DIG. 1.1 |
| 3,381,919 | 5/1968 | Girard ........................ 244/DIG. 1.1 |
| 3,455,261 | 7/1969 | Perrin ..................................... 114/39 |
| 3,858,542 | 1/1975 | Lenoble ............................... 114/103 |
| 3,884,172 | 5/1975 | Takahashi ............................. 114/39 |
| 3,924,870 | 12/1975 | Spivack et al. ..................... 114/103 |
| 4,116,406 | 9/1978 | Hamilton ................... 244/DIG. 1.1 |
| 4,269,133 | 5/1981 | Brown ................................. 114/103 |
| 4,369,724 | 1/1983 | Weiss ..................................... 114/39 |

FOREIGN PATENT DOCUMENTS

| 0015875 | 9/1980 | European Pat. Off. .............. 114/39 |
| 1955324 | 8/1966 | Fed. Rep. of Germany ........ 114/39 |
| 2833616 | 2/1980 | Fed. Rep. of Germany ........ 114/39 |
| 2941208 | 4/1981 | Fed. Rep. of Germany ...... 114/103 |
| 2173389 | 10/1975 | France .................................. 114/39 |
| 2464881 | 3/1981 | France ................................. 114/103 |
| 8200038 | 9/1982 | World Int. Prop. O. .......... 114/103 |
| 2050263 | 1/1981 | United Kingdom ...... 244/DIG. 1.1 |

OTHER PUBLICATIONS

Wolf, Jerzy, "The Basic Mecanics ... Future Prospects", Hovering, Craft & Hydrofoil, Mar. 1972, No. 6.
Advertisement for "Flight Sail", Rudder, Apr. 1963.
"Surf", Aug. 1980, Nor. 8, p. 44.

Primary Examiner—Sherman D. Basinger
Assistant Examiner—Jesûs D. Sotelo
Attorney, Agent, or Firm—Robert J. Koch

[57] ABSTRACT

A novel freely grasped hand-sail is described, which consists essentially of two profiled airfoil surfaces inclined towards each other at an angle between about 180° and 120°, the leading edges of this hand-sail also forming an angle between about 180° and 120°. In one embodiment, the airfoil consists of sails kept rigid by aerodynamically preformed battens, which sails are stretched symmetrically between two masts and a middle boom. The freely grasped sail turns around its horizontal axis when set against the wind, and stabilizes itself at a certain turn, whereby the section that is more vertically directed yields forward thrust forces, to propel, for example, a sailboard, and the section that is more horizontal in this position mainly yields upward thrust forces to compensate the weight of the hand-sail and the rolling moment exerted on the sail. Wave-jumping while wind-surfing, in particular, can be made easier with the help of this hand-sail.

13 Claims, 16 Drawing Figures

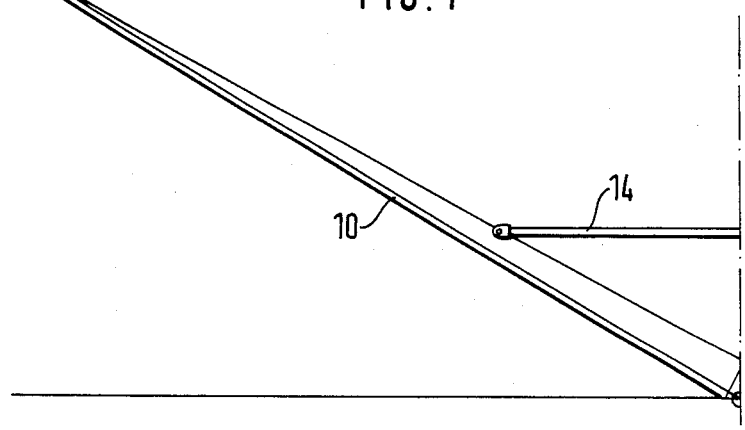
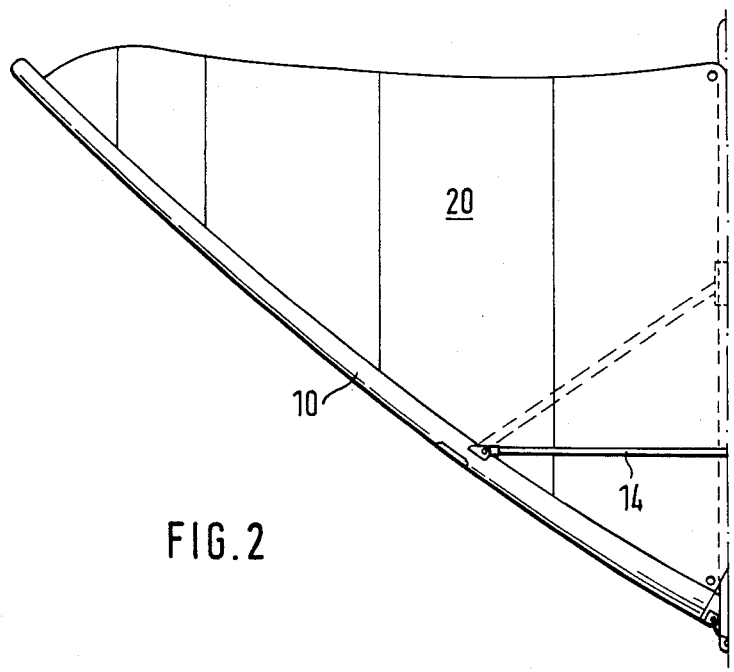

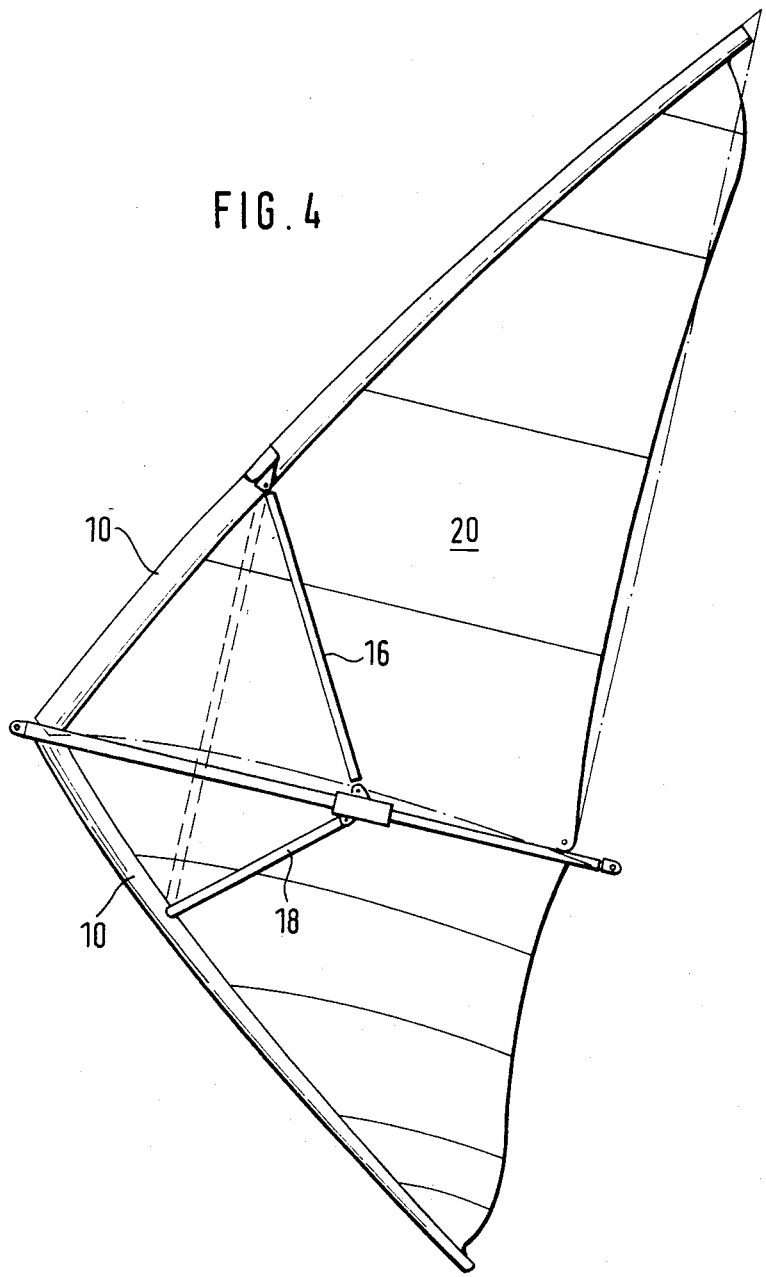

HAND SAIL

This application is a continuation of application Ser. No. 422,540, filed Sept. 24, 1982, now abandoned.

The invention relates to a hand-sail to propel land vehicles and watercraft, in particular, sailboards with low resistance in the direction of motion and relatively high resistance in the perpendicular direction.

It is already known that hand-sails can be used to propel sailboards, which hand-sails are chiefly supported at one corner to the surface of the sailboard, on which the user is seated, and, like a square sail, give the sailboard a certain forward thrust, especially when the wind is favorable.

Sailboards having a rig firmly connected with the board by a universal joint are also known, whereby the user, standing up, grips the rig by means of a shaft designed like a wishbone gaff. The development of this type of sailboard has greatly progressed in the past few years, whereby in particular the shape of the board has been worked on. The rig itself has remained largely unchanged. The sailboards, which were mainly used at first in inland areas, are now increasingly used for surfing on the coast, whereby not just sailing or surfing, but also the new variation of jumping is practised. In this case a sudden change of direction produces such an up-thrust in the sail that is temporarily being pulled taut that the entire board is raised out of the water and makes a more or less large jump, for example, over the crest of a wave. As the sail is cut, being a usual triangular one like that of the classical Bermuda rig, it does not yield a stable up-thrust in the flying phase, so that even experienced surfers frequently fall when they land after this type of jump. This type of jump, which is generally not dangerous in inland areas, can, however, often have disastrous consequences—not only for the surfer, but also for his rig and board—in the surf, where these jumps are taken.

More and more surfers, however, go in for the new fascination of "flying", whereby the constant improvement in their skill also plays a part.

So-called kites, consisting of a double section wing made of sailcloth spread onto a bar structure, have also been known for some years. A system of cinches is suspended in the wing's center of aerodynamic effort, in which the user is suspended under the wing in a sitting or reclining position and steers the kite by shifting his body weight. This type of kite has basically the same properties as the known gliders, i.e. it can sink down slowly at a certain speed when started off at an elevated point. Of course, these kites can also remain in the air for a longer period of time when there is a suitable thermal current or upwind. It is not possible to use this type of kite in connection with sailboards or similar land vehicles and watercraft.

The invention is based on the problem of providing a novel hand-sail suitable for propelling land vehicles and watercraft which has low resistance in the direction of motion and relatively high resistance in the perpendicular direction. In particular, the new hand-sail should give a new dimension to the wind-surfing sport by making it possible and/or easier to jump or even to fly under certain conditions.

This problem is solved according to the invention by forming the hand-sail out of two identical wings, the planes of which are arranged symmetrically to a center plane at an obtuse angle to each other, each having an airfoil profile, and arranging a grasping or holding device on the center plane beneath the wings.

This hand-sail, which may consist either of preformed profiles or of conventional sails, the profile of which comes about only under wind pressure, has the surprising effect of stabilizing itself automatically at a certain tilt at every angle to the true wind, the upward thrust of the hand-sail being regulatable by adjusting the wing surfaces in such a way that the weight of the hand-sail is compensated. The user, who generally grips the hand-sail freely, must only take care that the cross-wind force and the forward thrust force are transmitted to the vehicle, in particular, the sailboard, on which he is standing. The use of the hand-sail is not, of course, limited to the forward thrust of sailboards; it can also be used for small boats, skateboards, roller skates, land vehicles on wheels, skis, ice sleds and ice skates, etc.

The hand-sail, which, when its leading edges are set symmetrically against the true wind, mainly yields vertical forces, tilts around an essentially horizontal axis, on which the gripping device, preferably a middle boom, is located, when set against the wind. In the process, the wind force of one sail is rotated around an axis onto an approximately horizontal plane and propels the vehicle forward at an angle to the wind by the corresponding breakdown into cross-wind and forward thrust forces. The wind force of the other wing, which is now on an approximately horizontal plane, yields an upward thrust force which, on the one hand, compensates the weight of the airfoil wing and, on the other, stabilizes the airfoil wing at a certain tilt, so that the user does not need to provide any corrective rolling movements at all to the hand-sail with respect to its longitudinal axis (as seen from the direction of the wind.)

All possibilities offered by prior art are available for the material of the wings; an accordingly preformed rigid wing is as feasible as conventional sails whose profile arises only under wind pressure.

It has proved advantageous for the angle between the two wing surfaces to be approximately between 180° and 120°. The leading edges of the wings may also possibly be swept back, the sweepback angle on the plane of the leading edges also being between about 180° and 120°.

According to an advantageous embodiment of the invention, the hand-sail consists of a frame or structure of two masts and one middle boom, in which frame a sail is stretched, the middle boom being arranged beneath the sail so that it may be held by the user.

Further advantageous developments of the invention are the object of the sub-claims.

Figure 5A:
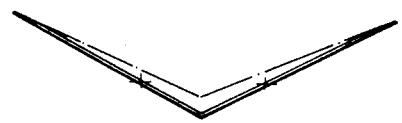

In the following an embodiment of the invention is described by way of example on the basis of the adjoined drawings. These show:

FIG. 1 a front view of the hand-sail, whereby only one side designed symmetrically to a center plane is shown, FIG. 2 a top view of the half of the hand-sail shown in FIG. 1, FIG. 3 a side view of the hand-sail turned 90° around the view in FIG. 1, FIG. 4 a side view of the complete hand-sail slightly tilted, FIGS. 5A,B to 10A,B schematic front and side views of the hand-sail to explain various sailing maneuvers.

According to FIGS. 1 to 4, the hand-sail consists of two masts 10, a middle boom 12 (FIGS. 3 and 4) and spreaders 14, 16, 18 which rigidly fix the mast 10 and the middle boom 12 in their respective positions. The two masts 10 then form an angle of 120° on a plane containing the masts; this angle is termed the sweepback angle in conventional aircraft construction. The masts enclose an angle of about 30° when the hand-sail is symmetrical with the horizontal, so that the angle formed by the wing surfaces with each other is also about 120°.

The fittings with which the spreaders 14, 16, 18 are attached to the mast 10 and the middle boom 12 are displaceable and can be fixed in different positions, so that the sweepback angle and the aperture angle of the wings can be varied within limits.

The two masts 10 are connected with each other at their base; the middle boom 12 is also attached to the connection of the two mast bases. Preferably this construction is designed in such a way that it is possible to vary the position of the mast and middle boom relative to each other, or even merge them completely. The points of attachment of the spreaders are located approximately one-half to one-third of the way to the tip of the mast. A particularly simple rigid geometrical shape results when the ends of every two spreaders are coupled at a common fitting so that the ends of all spreaders are on a common plane. When the frontal fitting or the fittings for the spreaders at the middle boom for the mast and the boom are designed rigidly enough, one can possibly dispense with the spreaders on the side or the middle spreader.

The sail 20 is stretched between the masts 10 and the middle boom 12 in such a way that the two masts are each introduced into a mast pocket of the sail, so that an aerodynamically clean fairing is provided on the luff area of the sail. Both mast pockets are stretched as required over a fitting arranged at the point of connection of the mast bases.

The after leech rope of the sail runs at approximately right angles to the middle boom 12 and is attached to the end of this boom, the so-called "boom yardarm". The sail is cut as a whole in such a way that it forms a sort of saddle surface when stretched, the saddle of which runs approximately along the middle boom 12 (cf. FIG. 3). It is of course also possible to use two separate triangular sails which are only connected with the frame at the boom yardarm 22, except for the mast pocket. In this case an elongated slit, which is aerodynamically unimportant, would be located in the sail above the middle boom 12.

To adjust the profile and/or trim the sail, a rope can also be stretched between the fore connection of the mast bases and the boom end 22, in the case of a one-piece sail, with which rope the sail can be hauled more closely towards the middle boom 12, whereby the sail profile flattens out; if the rope is loosened, the profile then bulges more.

The mast pockets preferably have windows in order to allow for displacement within limits of the fittings to which the spreaders 14, 16, 18 are attached.

A series of aerodynamically preformed sail battens or wing ribs can be set into the sail in order to preform an ideal airfoil profile from the outset and make the profile accordingly rigid.

In case the hand-sail is to be used to propel a sailboard, the hand-sail is grasped at the middle boom 12 and moved freely, whereby a horizontal wind force is produced by tilting the boom 12 on the vertical plane and turning the boom 12 on the horizontal plane or setting the hand-sail against the wind, and this wind force is transmitted by the user to an appropriate vehicle as a forward thrust, whereby the user applies his body weight to balance the forces.

In the following some sailing manoeuvers are described on the basis of FIGS. 5A, B to 10A, B.

FIGS. 5A to 10A each show a view of the hand-sail from the direction of the oncoming wind, while FIGS. 5B to 10B show a view of the hand-sail in the same position from a direction perpendicular to the oncoming wind. The function is explained in connection with the use of the hand-sail to propel a sailboard. It is obvious that any other land vehicle or watercraft can be used instead of the sailboard, as long as its resistance in the direction of motion is slight relative to its resistance perpendicular to it.

Figure 5B:
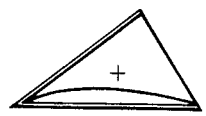

At first the hand-sail is raised out of the water by means of a starting sheet attached to its nose, i.e. the point of connection of the two mast bases with the fore end of the middle boom, which produces such an upward thrust as of a certain wind speed, around Beaufort 2, that the hand-sail bears itself; it then lies still in the wind in a horizontal position, since the two wing sections are equally large. If the wind does not suffice to produce enough upward thrust in the sail preformed by battens, the wing can also be placed on a support mast with a joint at the board and a joint at the middle boom, so that the hand-sail is then borne partly by its own upward thrust and partly by the support mast. This position is shown in FIGS. 5A and 5B.

Figure 6A:
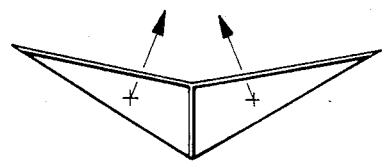
Figure 6B:
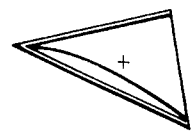
Figure 7A:
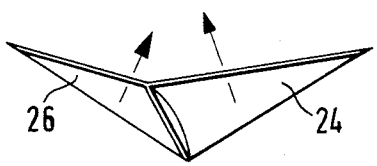
Figure 7B:
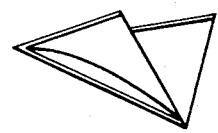

In order to produce forces, whether they be forward or upward thrust, with the help of the hand-sail, the hand-sail must now be set relative to the true wind. The effectivity of the flow around the profile is improved, the wind and/or upward force increases; both forces, however, are still in balance with each other, so that at first nothing happens except for an increased lift. This position is shown in FIGS. 6A and 6B.

Figure 8A:
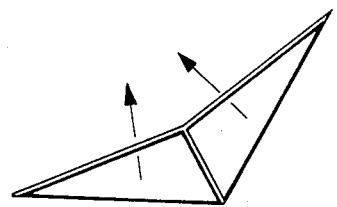
Figure 8B:
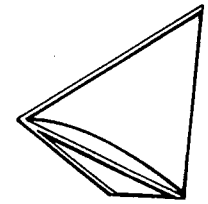

In the next phase, the entire hand-sail is turned sideways to the wind, which causes the angle of attack to be different on each wing section; the windward wing (reference 24 in FIG. 7A) receives a favorable oncoming flow and its effectivity is increased for the moment. This means that its relative wind force is increased, that it produces more upward thrust than the leeward wing (reference 26 in FIG. 7A). The rolling moment arising from the imbalance of the wind forces turns the entire hand-sail around the axis of the middle boom 12. The more the windward wing 24 is now turned from the horizontal to a vertical position, the more the wind force increases ahead and the less effect it has upwardly. At the same time, however, the upward forces of the leeward wing 26, which is now tilted downwards due to the rotation, increase, so that a balance of forces is finally reached again, in which the hand-sail counterbalances itself and remains in a position tilted between a horizontal and vertical direction. This tilt depends on how far the middle boom is turned away from the direction of the wind (this new counterbalanced position of the hand-sail is shown in FIGS. 8A and 8B). The horizontal component of the resulting wind force of the windward wing 24, which points in the direction of motion of the sailboard, now moves it forwards. As a considerable resulting vertical force still occurs in the position of the hand-sail shown, which can not necessarily be used as a forward thrust, the sail position shown is particularly well suited for half-wind or off-wind courses, since the sailboard is then relieved to a large extent and begins to glide sooner. The user should then use footstraps so that he can also utilize the vertical forces to relieve the board.

Figure 9A:
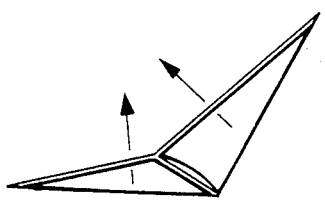
Figure 9B:
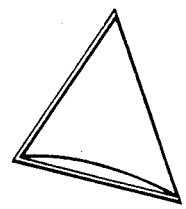
Figure 10A:
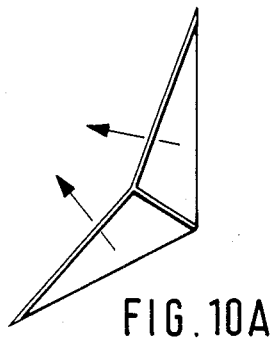
Figure 10B:
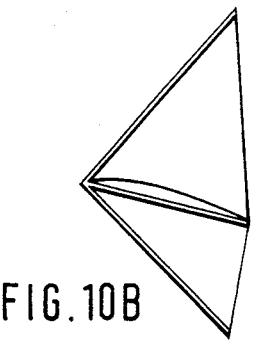

The hand-sail should be set somewhat further against the wind to ply windward, but the inclination of the middle boom 12 should then be slightly reduced relative to the position shown in FIG. 9A. The windward wing 24 is blown against even more, which leads to a further increase in the wind force, while the wind force on the leeward wing 26 is reduced to the same degree. The resulting rolling moment turns the hand-sail further around the axis of the boom 12 into the position shown in FIG. 10A, in which the vertical forces are again counterbalanced. This position, in which the main components of the wind forces of both wings 24 and 26 are directed horizontally to a large extent, are particularly well suited for tacking, when the greatest forward thrust forces are required.

The relation of upward thrust and forward thrust can thus be varied according to the turn of the rig. To jump over waves only the upward thrust forces will therefore be used to make a short gliding flight possible. It is only necessary that the hand-sail be turned to the position shown in FIG. 6A at the moment of take-off, so that a stable gliding position is arrived at. The exact positions of the hand-sail and/or the middle boom 12 relative to the direction of the wind on a horizontal plane, on the one hand, and on a vertical plane, on the other, must each be selected by the user according to the desired course, the wind and the waves. The hand-sail will always be counterbalanced, however, in every position, as far as its turn around the axis of the boom 12 is concerned, so that no rolling moments at all must be provided by the user to the middle boom 12.

If the hand-sail is used to propel a sailboard, the steering works the same way as with a usual rig, by displacing the aerodynamic center of the sail relative to the lateral point of pressure. It is advantageous that the hand-sail is not attached to the sailboard as in the case of the usual rig, but rather that the user can run around on the board at will to steer. When the wind is stronger it is also recommended that a known harness be used, the suspending line of which can either be attached to the boom 12 or to the lower spreaders 16, 18.

To turn around, the user goes to the aft with the hand-sail, which causes the board to come around to the wind; the nose of the hand-sail or rather its leading end is then drawn by the wind, the hands change their position (fore to aft, aft to fore) and the hand-sail is now turned to the wind in the other direction, whereby the user on the board goes to the fore to fall off again. The jibe works similarly. All manoeuvers basically have the advantage that the surfer does not have to go around a firmly mounted mast base, but rather can carry out turns and move everywhere on the sailboard, whereby he is only dependent on the trim of the board.

The middle boom may possibly also be replaced by a known wishbone boom. In this case the spreaders 16, 18 may be replaced by one additional spreader attached to spreader 14 to hold or support the upper part of the wishbone boom.

I claim:

1. A hand-sail supported solely by a user to propel land vehicles and watercraft, in particular sailboards with little drag in the direction of motion and relatively great drag perpendicularly, comprising two identical mirror-imaged wing means for utilizing wind forces incident aganst a lower surface thereof for propulsion and self-stabilization, the planes of which are arranged at an obtuse angle of from 120° up to 180° to each other symmetrically to a medium plane, each having an airfoil profile, and a rigid middle boom or handlebar arranged on a center plane beneath the lower surface of said wing means, for grasping or holding the hand-sail by the user, said rigid middle boom extending over the entire length of said wing means.

2. A hand-sail as in claim 1, characterized in that the airfoil profile arises when acted upon by the wind.

3. A hand-sail as in claim 1, characterized in that the airfoil profile is preformed.

4. A hand-sail as in claim 1, or 2, characterized in that the leading edges of the wing means of the hand-sail are swept back.

5. A hand-sail as in claim 4, characterized in that the sweep-back angle of the leading edges on the plane containing the leading edges ranges from 180° to 120°.

6. A hand-sail as in claim 5, characterized in that the wing means are designed as sails which are stretched between two masts (10) having two connected ends forming the leading edges of the wings means and said middle boom (12) is attached at its fore end to the connection of the two mast ends and serves as said rigid middle boom for grasping or holding the hand-sail.

7. A hand-sail as in claim 6, characterized in that the two masts (10) connected at the ends are held together in a spread position by means of a spreader (14) and each mast (10) is supported by the middle boom (12) by a further spreader (14, 16).

8. A hand-sail as in claim 7, characterized in that the spreaders can be fixedly attached longitudinally in different positions at the masts (10) and the middle boom (12).

9. A hand-sail as in claim 8, characterized in that the further spreaders are directed from the masts (10) to the aft end of the middle boom (12).

10. A hand-sail as in claim 6, characterized in that the length of the middle boom (12) is such that the after leeches of the sails are attached at the aft end of the boom (12).

11. A hand-sail as in claim 6, characterized in that the sails are of one piece and can be trimmed by a stretching line stretched between the fore end and the yardarm of the boom (12).

12. A hand-sail as in claim 6, characterized in that each wing (24, 26) has a separate sail which can be trimmed independently of the other.

13. A hand-sail as in claim 12, characterized in that the sails have aerodynamically preformed sail battens or ribs.

* * * * *